United States Patent [19]
David et al.

[11] Patent Number: 6,018,203
[45] Date of Patent: *Jan. 25, 2000

[54] APPARATUS FOR AND METHOD OF EVENLY DISTRIBUTING AN ELECTRICAL LOAD ACROSS AN N-PHASE POWER DISTRIBUTION NETWORK

[75] Inventors: Yair David, Ramat Hasharon; Lupu Wittner, Netanya, both of Israel

[73] Assignee: Target Hi-Tech Electronics Ltd., Netanya, Israel

[*] Notice: This patent is subject to a terminal disclaimer.

[21] Appl. No.: 08/761,888

[22] Filed: Dec. 9, 1996

Related U.S. Application Data

[63] Continuation-in-part of application No. 08/446,968, May 22, 1995, Pat. No. 5,604,385.

[51] Int. Cl.$^7$ ...................................................... H02J 1/10
[52] U.S. Cl. ................................ 307/52; 307/18; 307/29; 307/38
[58] Field of Search .................................. 307/11, 18, 19, 307/23, 24, 29, 31–39, 52, 80, 85–87, 125, 129, 131; 364/480, 492, 493; 363/9

[56] References Cited

U.S. PATENT DOCUMENTS

| | | | |
|---|---|---|---|
| 3,991,359 | 11/1976 | Thompson et al. | 323/4 |
| 4,659,942 | 4/1987 | Volp | 307/19 |
| 5,181,180 | 1/1993 | Munro | 364/492 |
| 5,182,464 | 1/1993 | Woodworth et al. | 307/87 |
| 5,191,520 | 3/1993 | Eckersley | 363/72 |
| 5,477,091 | 12/1995 | Fiorina et al. | 307/66 |
| 5,604,385 | 2/1997 | David | 307/52 |

Primary Examiner—Fritz Fleming
Assistant Examiner—Jonathan S Kaplan
Attorney, Agent, or Firm—Mark M. Friedman

[57] ABSTRACT

An apparatus for and method of evenly distributing an electrical load across an n-phase power distribution network. The current in each incoming phase and in each branch circuit is measured by a current sensor. The outputs of the current sensors are monitored by a processor. Associated with each branch circuit is a multi-pole switch and a conventional circuit breaker. Each switch is able of connecting its corresponding branch circuit to any incoming phase, and of disconnecting the branch circuit from all n phases. The processor periodically monitors currents flowing through each incoming phase and, based on branch circuit load conditions, reprograms the switches to keep the branch circuit loads evenly distributed across all three incoming phases. A further feature provides the pre-programmed, processor-controlled, changing of load connections, for example as a function of time-of-day; and to provide a "priority list" for dropping loads in case of an overloaded power-line condition, and for subsequently reconnecting loads. A further feature provides telephone communication between the processor and the electric company, including the capability of transmitting information to the electric company. The capability of the electric company to make inquiries of the processor, e.g., concerning loading of each of the phases. The capability of the electric company to issue commands to the processor, e.g., to connect or to disconnect loads, and the capability of the electric company to remotely alter the programming the processor via the telephone connection and the ability to monitor electric power consumption.

10 Claims, 11 Drawing Sheets

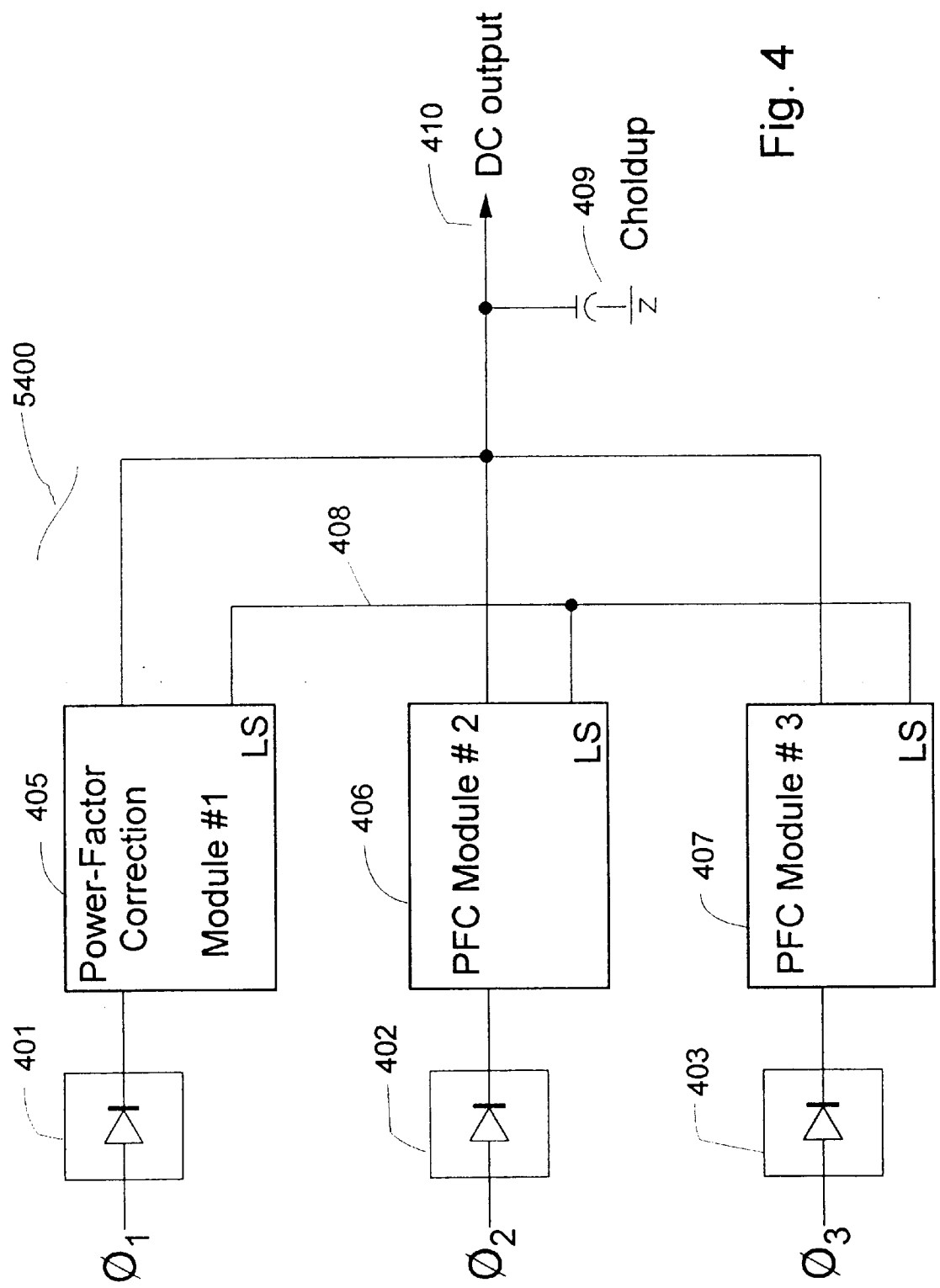

ary, many residential homes and commercial facilities receive, at their service entrances, all three phases in a three phase electrical power distribution network provided by an electric utility or power company. In a typical three

APPARATUS FOR AND METHOD OF EVENLY DISTRIBUTING AN ELECTRICAL LOAD ACROSS AN N-PHASE POWER DISTRIBUTION NETWORK

This application is a Continuation-in-Part of U.S. patent application Ser. No. 08/446,968, attorney docket, 538/1, filed May 22, 1995, now U.S. Pat. No. 5,604,385.

FIELD AND BACKGROUND OF THE INVENTION

The present invention relates to an apparatus for and method of evenly distributing the electrical load in a three phase electrical power distribution network.

Presently, many residential homes and commercial facilities receive, at their service entrances, all three phases in a three phase electrical power distribution network provided by an electric utility or power company. In a typical three phase distribution environment each phase supplies one or more branch circuits. The determination of which branch circuit or circuits to wire to each of the three incoming phases is usually made at the time the facility is designed or constructed and is difficult to change once the facility is completed. For example, in a residential facility, different branch circuits might supply the kitchen, living room, bedrooms, etc. with electricity. In a commercial environment, different branch circuits might supply machinery, offices, etc. A problem that arises frequently is how to evenly distribute electrical power across from the three incoming phases, supplied by the electric utility, to all branch circuits. Often, over time, the load topology of a facility will change, sometimes drastically. Some branch circuits become more heavily loaded and others less heavily loaded, due to, for example, movement of machinery on a factory floor, the addition of or movement of high wattage appliances (i.e. refrigerator, electric stove, microwave oven, etc.) in a home. Thus, the load on each of the three incoming phases will also change with the changing load on the branch circuits. A three phase network that was evenly balanced initially might become unbalanced over time.

One solution to this problem is to reassign each branch circuit to an incoming phase to achieve an even load across all three phases by physically rewiring each branch circuit. A disadvantage of this solution is that it potentially requires the costly rewiring of electrical closets and distribution panels every time the three phases become unbalanced, which might occur frequently. Another disadvantage is that the rewiring typically requires a disruption in power causing a potential problem for utility customers. In addition, this solution only provides a crude mechanism of balancing the load across the three incoming phases. It does not track power consumption on each phase and branch circuit on a frequent basis. The hour to hour and minute to minute changes in electrical loading that occur, which might be large enough to cause major unbalancing across the three incoming phases, pass undetected.

SUMMARY OF THE INVENTION

The present invention provides an apparatus for and a method of evenly distributing the electrical load across all three phases of a three phase power distribution network that overcomes the disadvantages of previous solutions.

According to the teachings of the present invention, there is provided a three phase load distribution system comprising a first, second and third current sensor coupled to a first, second and third phase, respectively, of a three phase electrical power distribution network, the first, second and third current sensors for measuring the electrical current flow through the first, second and third phase, respectively, a plurality of switches, each switch coupled to one of a plurality of branch circuits, each of the plurality of switches for connecting any one of the first, second or third phases to one of a plurality of branch circuits, a plurality of current sensors, each current sensor coupled to one of the plurality of branch circuits, the plurality of current sensors for measuring the electrical current flow through each of the plurality of branch circuits and a processor coupled to the first, second and third current sensors, the plurality of switches and the plurality of current sensors, the processor for controlling the plurality of switches so that the electrical current flow through the first, second and third phases do not exceed a predetermined threshold.

Further, according to the teachings of the present invention, there is provided a three phase load distribution system comprising a first, second and third current sensor coupled to a first, second and third phase, respectively, of a three phase electrical power distribution network, the first, second and third current sensors for measuring the electrical current flow through the first, second and third phase, respectively, a plurality of switches, each switch coupled to one of a plurality of branch circuits, each of the plurality of switches for connecting any one of the first, second or third phases to one of a plurality of branch circuits, a plurality of current sensors, each current sensor coupled to one of the plurality of branch circuits, the plurality of current sensors for measuring the electrical current flow through each of the plurality of branch circuits and a processor coupled to the first, second and third current sensors, the plurality of switches and the plurality of current sensors, the processor for controlling the plurality of switches so that the differences between the electrical currents, or the ratios of the electrical currents, flowing through each pair of the first, second and third phases do not exceed a predetermined threshold.

BRIEF DESCRIPTION OF THE DRAWINGS

The invention is herein described, by way of example only, with reference to the accompanying drawings, wherein:

FIG. 4 is an alternative to the implementation of FIGS. 2 and 2B;

DESCRIPTION OF THE PREFERRED EMBODIMENT

The principles and operation of the present invention may be better understood with reference to the drawings and the accompanying description.

Figure 1A:
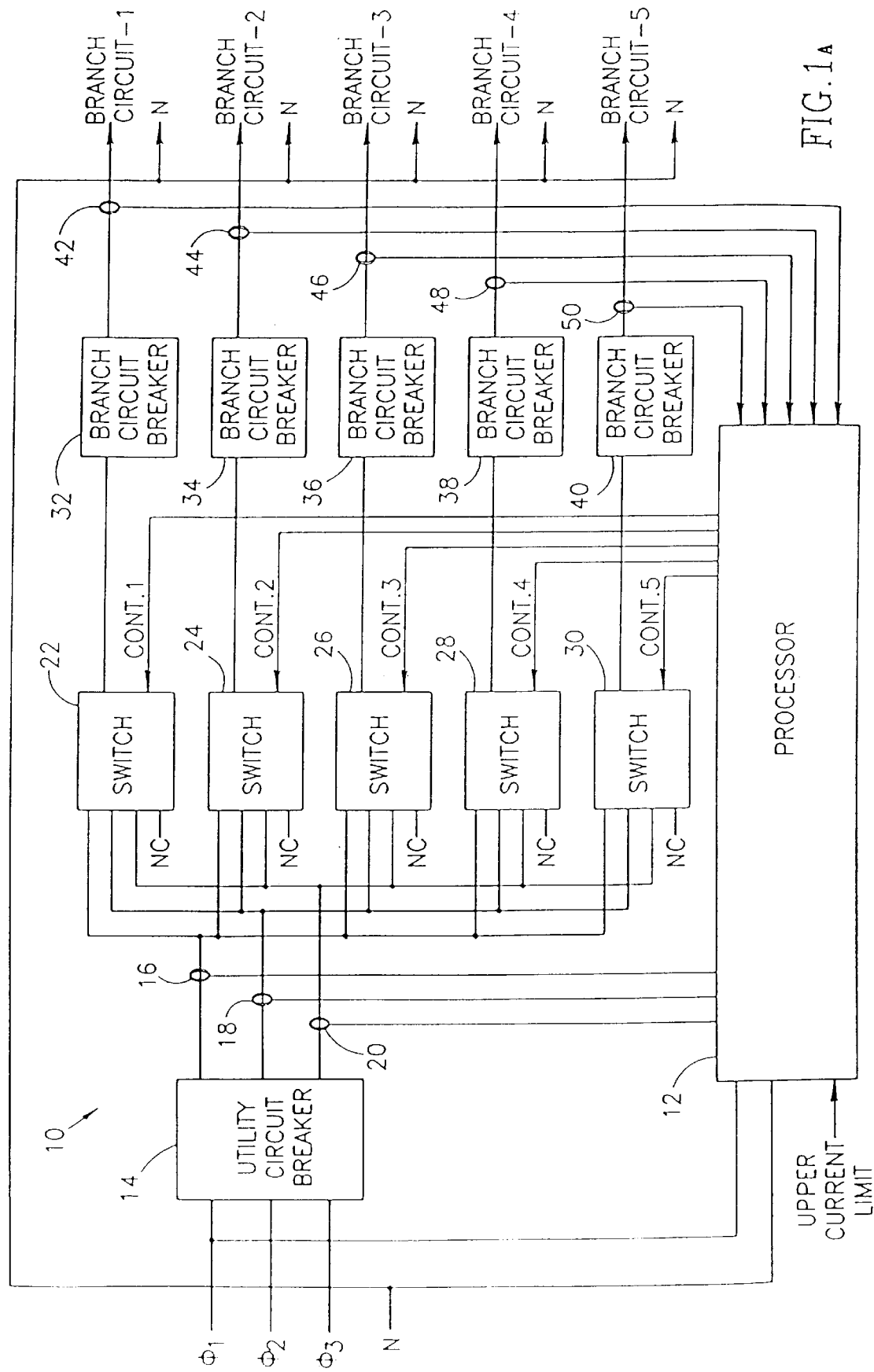
FIG. 1A is a block diagram of a 3-phase embodiment of the present invention.

A block diagram of a device 10 embodying the present invention is shown in FIG. 1. Three phase electrical power, represented by $\phi 1$, $\phi 2$, $\phi 3$, is supplied by an electric power utility. Phases $\phi 1$, $\phi 2$, $\phi 3$ are over current protected by a utility circuit breaker 14. The output of utility circuit breaker 14 appears at the service entrance to a residence or commercial facility. Current sensors 16, 18, 20 measure the current flowing through phases $\phi 1$, $\phi 2$, $\phi 3$, respectively. The output of current sensors 16, 18, 20 are monitored by a processor 12. Processor 12 can be any suitable computing device such as a microprocessor, microcontroller, personal computer, etc.

Each of the three phases output from utility circuit breaker 14 are input to an array of multi-pole switches 22, 24, 26, 28, 30. Each switch has four input terminals. Three terminals are provided, one each for each of the three incoming phases. In addition, a forth terminal is provided that is a no connection terminal (i.e. not connected to anything). The output of switches 22, 24, 26, 28, 30 are input to an array of branch circuit breakers 32, 34, 36, 38, 40, respectively. Control signals CONT1, CONT2, CONT3, CONT4, CONT5, output from processor 12, determine the position of switches 22, 24, 26, 28, 30, respectively. The output of branch circuit breakers 32, 34, 36, 38, 40 pass through an array of current sensors 42, 44, 46, 48, 50, respectively, before supplying each of the five branch circuits with power. Each of the five branch circuits has a neutral line N associated with it. The current measured by current sensors 42, 44, 46, 48, 50 is monitored by processor 12.

Operation of device 10 centers around multi-pole switches 22, 24, 26, 28, 30. In the application of device 10, each branch circuit to be covered has associated with it a switch, a branch circuit breaker and a current sensor. Shown in FIG. 1 is a load balancing system covering five branch circuits. The present invention, however, could easily be made to cover any number of branch circuits, simply by providing sufficient components.

On a periodic basis, processor 12 acquires the output of current sensors 16, 18, 20, which measure the current flowing though each phase of the supplied three phase power. Processor 12 also monitors the output of current sensors 42, 44, 46, 48, 50, which measure the current flowing through each branch circuit. The time between successive acquisitions of current sensor data is on the order of milliseconds or tens of milliseconds and is a function of the software controlling processor 12. The data acquired during each data acquisition cycle is not immediately discarded. A finite number of the most recent sets of acquired data are kept in memory, which may be either internal or external to processor 12.

Processor 12 is suitably programmed to periodically acquire data from all current sensors in order to be able to track the load on each phase of the incoming three phase power and on each branch circuit. When the measured current on any one phase exceeds a fixed percentage (e.g., 90%) of an upper current limit setting, processor 12 programs switches 22, 24, 26, 28, 30 so that the total load is fairly equal across the three incoming phases. Since the load on each branch circuit is known, processor 12 can redistribute the branch loads so that the load on each phase is approximately equal. Once the new switch settings are determined, processor 12 outputs switch repositioning commands over control lines CONT1, CONT2, CONT3, CONT4, CONT5 to switches 22, 24, 26, 28, 30, respectively.

During operation of device 10, it is possible that the load on a single branch circuit increases to a level that exceeds the maximum permitted branch current. In response to this possible over current condition, processor 12 can program the branch circuit's corresponding switch to its no connection position. In this position, the branch circuit is electrically disconnected from all three incoming phases. In addition to the over load protection provided by processor 12, conventional branch circuit breakers 32, 34, 36, 38, 40 also provide over current protection for each branch circuit. Device 10 is also able to provide a function conventional circuit breakers are currently not able to provide. Processor 12 can be suitably programmed to predict potential overload conditions before they occur by monitoring the rate of rise in current use by each branch circuit and by each incoming phase. Thus, potential disruptions in power due to exceeding current limits on an incoming phase can be anticipated and avoided before they occur.

Switches 22, 24, 26, 28, 30 may utilize relays and semiconductor switches (i.e. triacs, silicon controlled rectifiers, etc) as their core switching elements. Each switch decodes its corresponding control signal, received from processor 12, and either connects its output to one of the three incoming phases or totally disconnects its output from all three phases. Switches 22, 24, 26, 28, 30 can switch their output terminals to any incoming phase fast enough so that devices or equipment connected to their corresponding branch circuit do not see any appreciable gap in supplied power and thus, are not adversely effected.

Processor 12 derives its power from $\phi 1$ and the neutral line N of the incoming three phase power. Processor 12 can, however, derive power from any of the three incoming phases. The upper current limit setting can be input to processor 12 any number of ways, all well known in the art. For example, the upper current limit data could be hard coded in a read only memory device, supplied by external dip switch settings, supplied by an external computing device, etc.

Figure 1B:
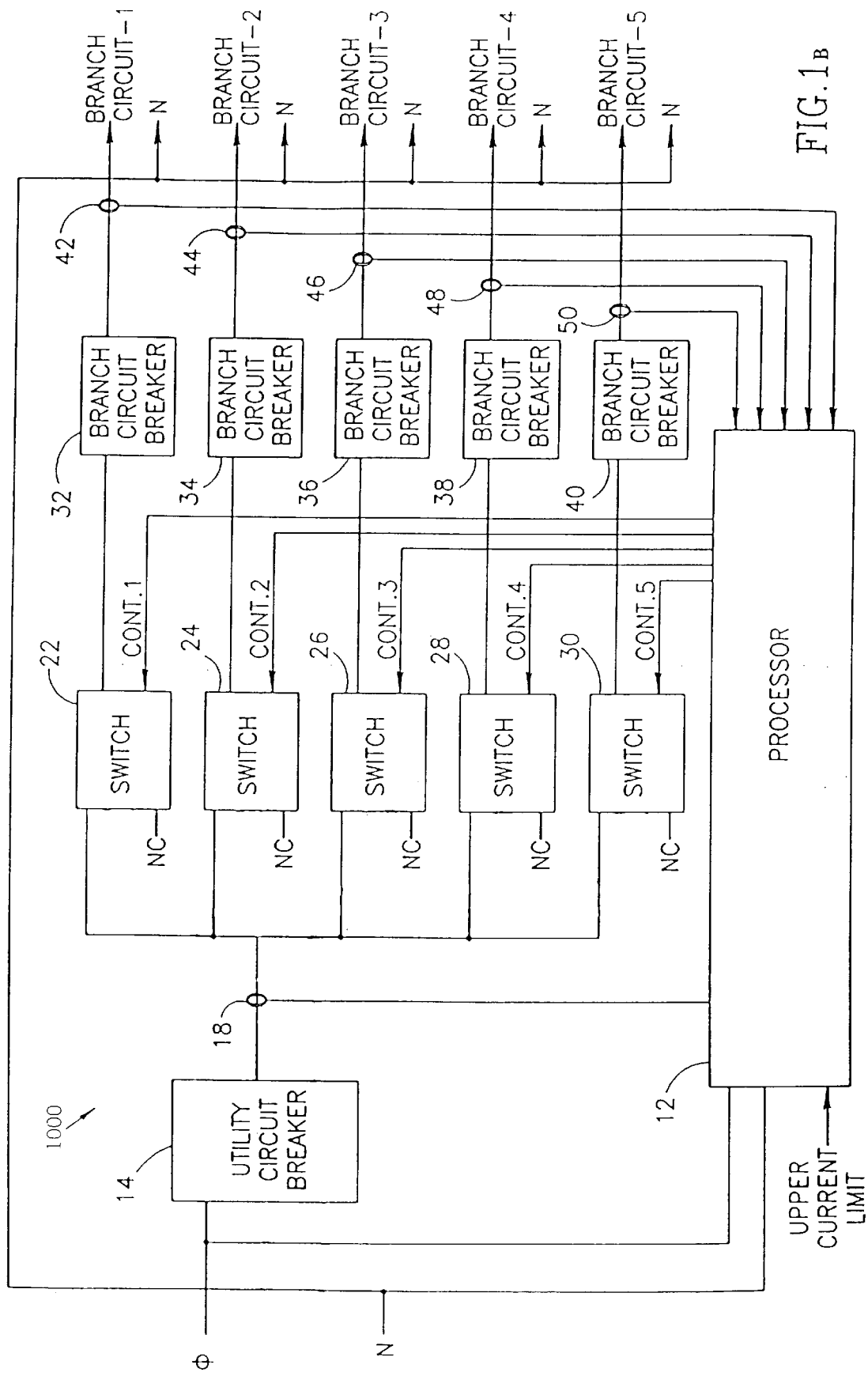
FIG. 1B is a block diagram of a 1-phase embodiment of the present invention.

While the description of the above embodiment has been given with respect to 3-phases, it will be appreciated that the system of the present invention may be implemented as an n-phase system, for any n. To illustrate this point a 1-phase system, 1000, is shown in FIG. 1B. Comparing FIGS. 1 and 1B, in FIG. 1B, two of the input phases have been deleted. The blocks, functionality, and labels are all the same otherwise. The only difference between a one-phase system and a two-or-greater phase system, is that switches 22–30 are only capable of connecting or disconnecting their respective branch circuits to the one phase, and not of changing the branch circuit connection from one phase to a different phase. Thus in a one-phase system, the only option in case of an overloaded system is to select which branch circuit to disconnect, not to choose to which phase the branch circuit will be reconnected. Thus the present invention applies to power sources of any number of phases, although the usual cases are those of 3-phases and 1-phase, as illustrated in FIGS. 1 and 1B, respectively.

A second embodiment of the present invention, shown in FIG. 2, functions to evenly distribute the load across each phase of a three phase power distribution network. Each phase, φ1, φ2, φ3, of a three phase power distribution network is input to an electrical power summing circuit 52. Summing circuit 52 functions to receive each incoming phase and combine its current and power handling capacity and subsequently form a single summed output. The output from summing circuit 52 is a single AC electrical voltage having a current capability approximately equal to the sum of the current capabilities of the three incoming phases.

The output of summing circuit 52 is subsequently input to a rectifier 54. Rectifier 54 rectifies the AC output of summing circuit 54 to essentially a DC level. The current carrying capability of rectifier 54 must be sufficient to handle the total current needs of all the branch circuits combined that are to be covered by device 10.

The output of rectifier 54 is input to an AC generator 56. AC generator 56 produces a single phase AC voltage from the DC voltage output by rectifier 54. The appropriate voltage and frequency (e.g., 120 V, 60 Hz for the United States) is generated for the particular locality device 10 must operate in.

The output of AC generator 56 is input to branch circuit breakers 32, 34, 36, 38, 40, covered by device 10. The branch circuits are supplied with power by the output of branch circuit breakers 32, 34, 36, 38, 40. Although five branch circuits are shown in FIG. 2, any number of branches can be covered by device 10, provided the components have sufficient current ratings for the combined load of all branch circuits.

The actual load distribution in device 10 occurs in summing circuit 52. No matter how the load on each branch circuit increases or decreases it is automatically distributed evenly across all three incoming phases. For example, if the load on any one branch or a group of branches increases by 30%, the corresponding load on each incoming phase increases 10%. Since each incoming phase can be represented by an equivalent low impedance source of current that are identical to each other, if the load on summing circuit 52 increases 30% then this increase appears equally across each of the three incoming phases.

The advantage of this second embodiment over the first embodiment, is that it is less complex, however, it is possibly more costly because expensive components must be utilized for summing circuit 52, rectifier 54 and AC generator 56 that are capable of handling the increased levels of current.

Figure 2A:
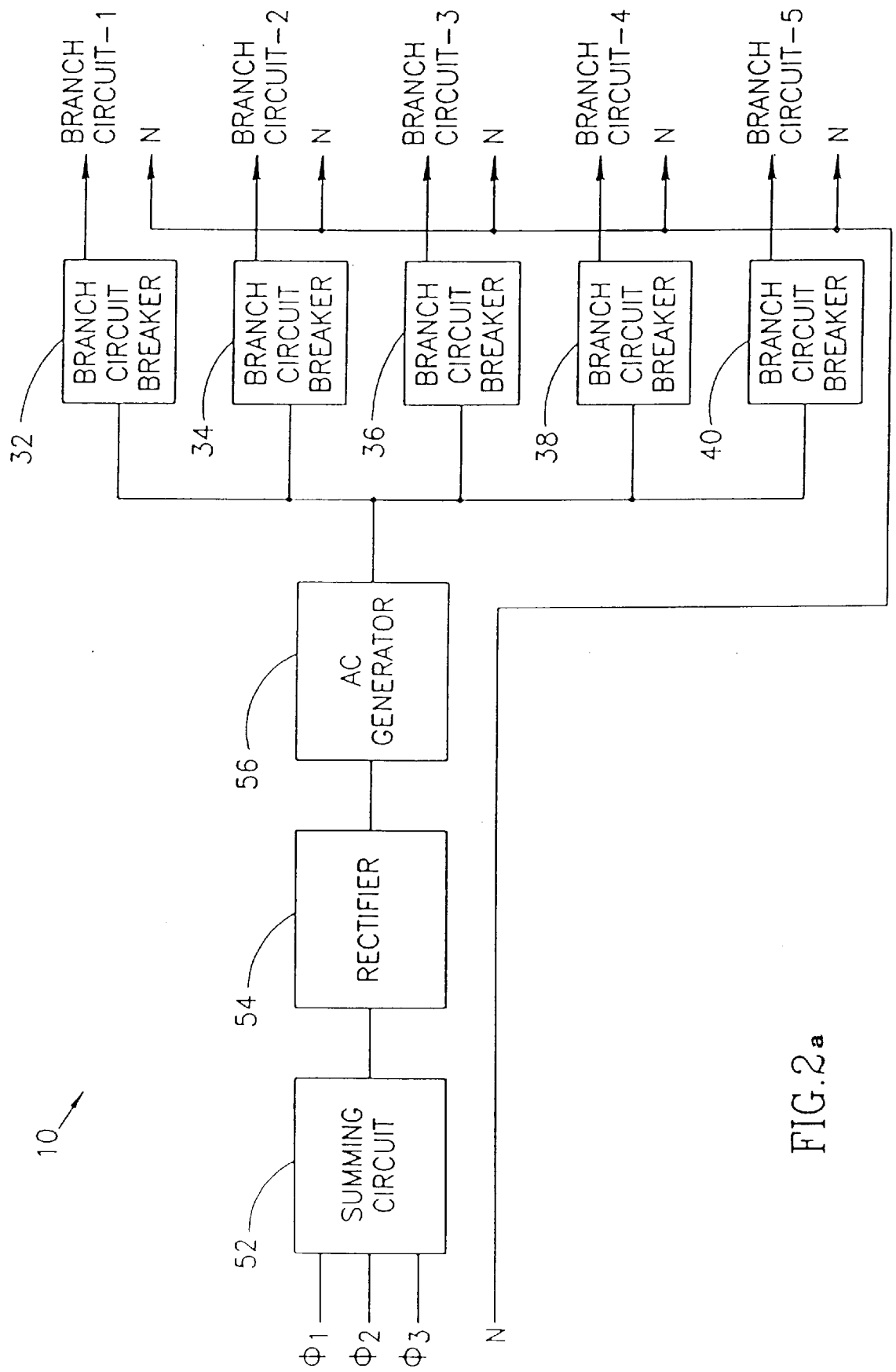
FIG. 2A is a block diagram of an embodiment of the present invention.
Figure 2B:
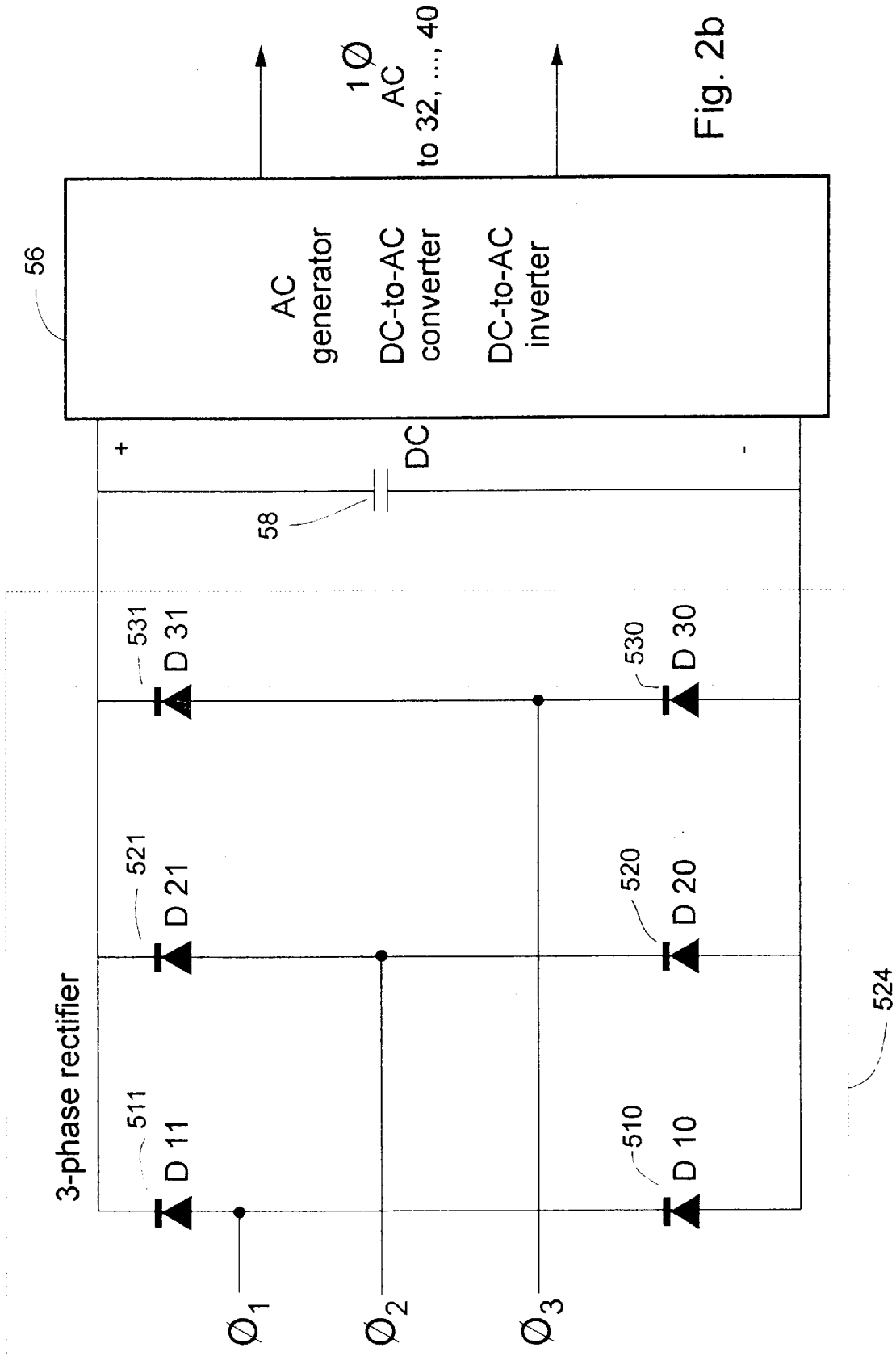
FIG. 2B shows a simple implementation of the summing circuit 52, rectifier 54, of FIG. 2, combining the two functions in one block, 3-phase rectifier, 524.

FIG. 2B shows a simple implementation of the summing circuit 52, rectifier 54, of FIG. 2, combining the two functions in one block, 3-phase rectifier, 524. FIG. 2B also shows optional filter capacitor, 58.

It is important to note that the system of FIGS. 2 and 2B is not a battery backup or uninterruptible power supply system, but rather provides balancing of the loading due to the single phase output circuit, equally, on the three input phases, by the use of the summing circuit, 52. The presence of the summing circuit, 52, results in the loading of the single-phase phase output circuit to be instantaneously substantially equally shared across all three phases of the input 3-phase power circuit, even without the load-balancing processor, 12, of FIG. 1. Hence, the FIG. 2 and 2B system provides a performance improvement of the system of the present invention over the implementation of FIG. 1. Thus, a power distribution system such as the prior art battery-back-up system disclosed by Fiorina in U.S. Pat. No. 5,477,091, which is a completely one-phase system, including back-up battery, can not render obvious the load-balancing function accomplished by the FIG. 2 and 2B implementation of the present invention.

Further the AC generator, 56, can be realized as a "stationary converter"—a dc-to-ac converter or dc-to-ac inverter, without departing from the teaching of the present invention, as an "ac generator" is just a "rotary converter". Thus a stationary converter may also be used as is well known. An example schematic of a "stationary converter" dc-to-ac-inverter is given in FIG. 2C. DC input, 213, from summer rectifier, 524, powers dc-to-ac inverter, 200, providing square-wave ac output, 211, which, after optional low-pass filtering by inductors 208 and 209 and capacitor 210, becomes sinusoidal ac output, 212. The example circuit given is a free-running, push-pull oscillator, consisting of a pair of switching transistors, 201 and 202, the collectors of which are connected to the ends of the primary winding, 207a, of saturating-core transformer, 207. The DC input is applied from the center-tap of the primary to the common connection of the emitters of 201 and 202. Forward-bias is applied to transistors 201 and 202 by resistors 203 and 204, respectively, which are bypassed for ac by capacitors 205 and 206, respectively. Feedback is coupled by transformer winding 207c to the base of transistor 201, and by transformer winding 207d, to the base of transistor 202. The oscillator is free-running at a frequency depending on the saturating transformer design. This is a crude implementation of this type of circuit, and is given as an example, to illustrate the principle of operation. This is known as a Royer Oscillator, after the inventor. The circuit was published in, Royer, G. H., *A Switching Transistor AC to DC Converter,* Trans AIEE, July '55.

Figure 2C:
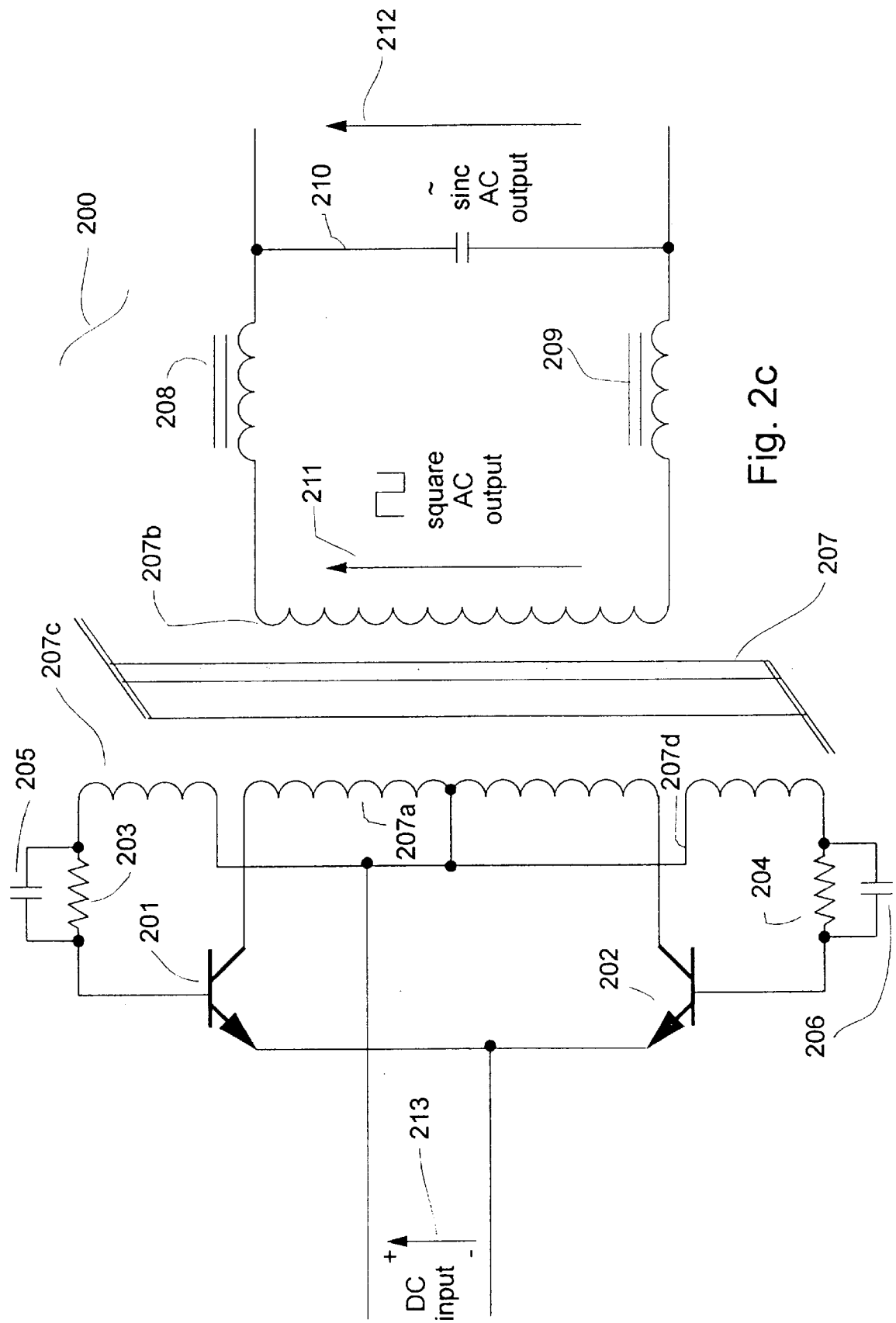
FIG. 2C is an schematic of a "stationary converter" dc-to-ac inverter.
Figure 2D:
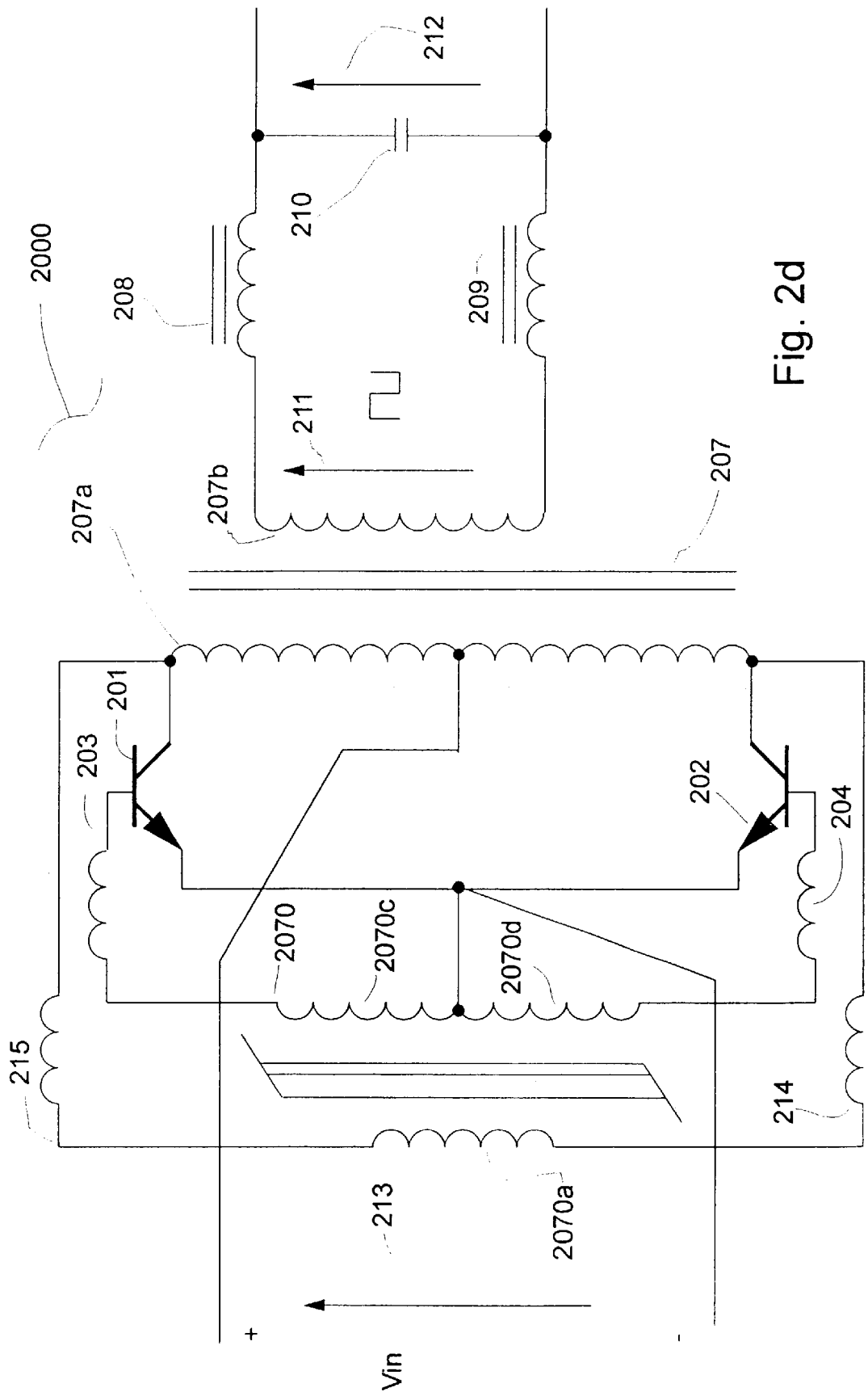
FIG. 2D is an schematic of an improved "stationary converter"dc-to-ac inverter.

Improved designs, such as inverter, 2000, in FIG. 2D, use a non-saturating transformer for 207, and add a saturating feedback transformer, 2070, to the base circuitry. The saturating base feedback transformer then determines the operating frequency of the dc-to-ac inverter. This circuit does not provide output voltage regulation. In both circuits, the square-wave secondary output peak-to-peak voltage depends on the input dc voltage, and the output frequency depends on the dc input voltage as well as on the saturating transformer characteristics. This improved inverter was published in Jensen, J. L., *An Improved Square Wave Oscillator Circuit,* Trans. IRE, Vol. CT-4, No. 3, September '57.

The FIG. 2 system, then, can be implemented inexpensively by the combination of the three-phase rectifier of FIG. 2B with an inverter such as in FIG. 2C or 2D. The three-phase rectifier balances the loading equally across each of the three input phases with no computational equipment required.

The system of FIGS. 2, 2B, and 2C or 2D, may be applied equally well to a 2-phase system, or to a system of greater than 3-phases, i.e., to an "n-phase" power distribution system. Filter capacitor, 58, and low-pass filter, 208, 209, and 210, may be optionally included, to provide sine-wave output, 212, depending on the output spectrum required by the load circuitry to be supplied.

The FIG. 2, 2B, 2C system is especially well-suited for small-scale installations, say, an individual factory. In this case the use of this implementation of the present invention will be helpful also in reducing the power-factor-correction problem at the entrance to the site, since all the various motor loads, and other non-purely-resistive loads, will have been removed from the ac power entrance to the site, and replaced by one "rectifier-input" circuit. It is possible, that with omission of capacitor 58, or the use of a very small capacitive for noise filtering alone, that the inductance of primary 207a of transformer 207, which will look inductive, will present an improved power factor over that of an installation without this load-balancing circuitry present. This is because a capacitor-input rectifier provides a power factor of about 0.6, while an "infinite-inductor" rectifier circuit ideally provides a power factor of about ninety percent. The improved form of dc-to-ac inverter of FIG. 2D, with a non-saturating collector transformer for 207, and with a separate saturating base transformer, 2070, should provide still greater improvement in site input power factor. Finally, a third variation is a "current-fed" push-pull converter, in which a large inductor is added in series with the dc supply input connection to the center tap of transformer, 207. This would provide increased inductance in the rectifier circuit, further increasing input power factor. A high, near-unity power factor is important to the power utility companies, since this represents a possible savings in power distribution facilities cost, as is well known. FIG. 2E shows system, 10, including three-phase rectifier, 524, and an improved "stationary converter" dc-to-ac inverter, 200, with inductor, 2071, added to increase input power factor. A purely resistive load has a power factor of 1.0. Load current phase shift due to non-resistive loads, and distortion due to non-linear loads, reduce the power factor and result in increased facilities cost to the electric company, due to inefficient coupling of electrical energy to the consumer load site.

While the stationary inverter circuits illustrated are very old technology, they represent the simplest, least expensive implementation. Newer push-pull switching regulators, incorporating feedback control circuitry, and with no saturating transformers may be used to implement stationary inverters having input-voltage-independent output voltage and frequency. The implementation of such inverters when operating from low-voltage battery supplies is well known. The design of such circuits for higher input voltage is straightforward, less difficult than the low-voltage input case.

Figure 2E:
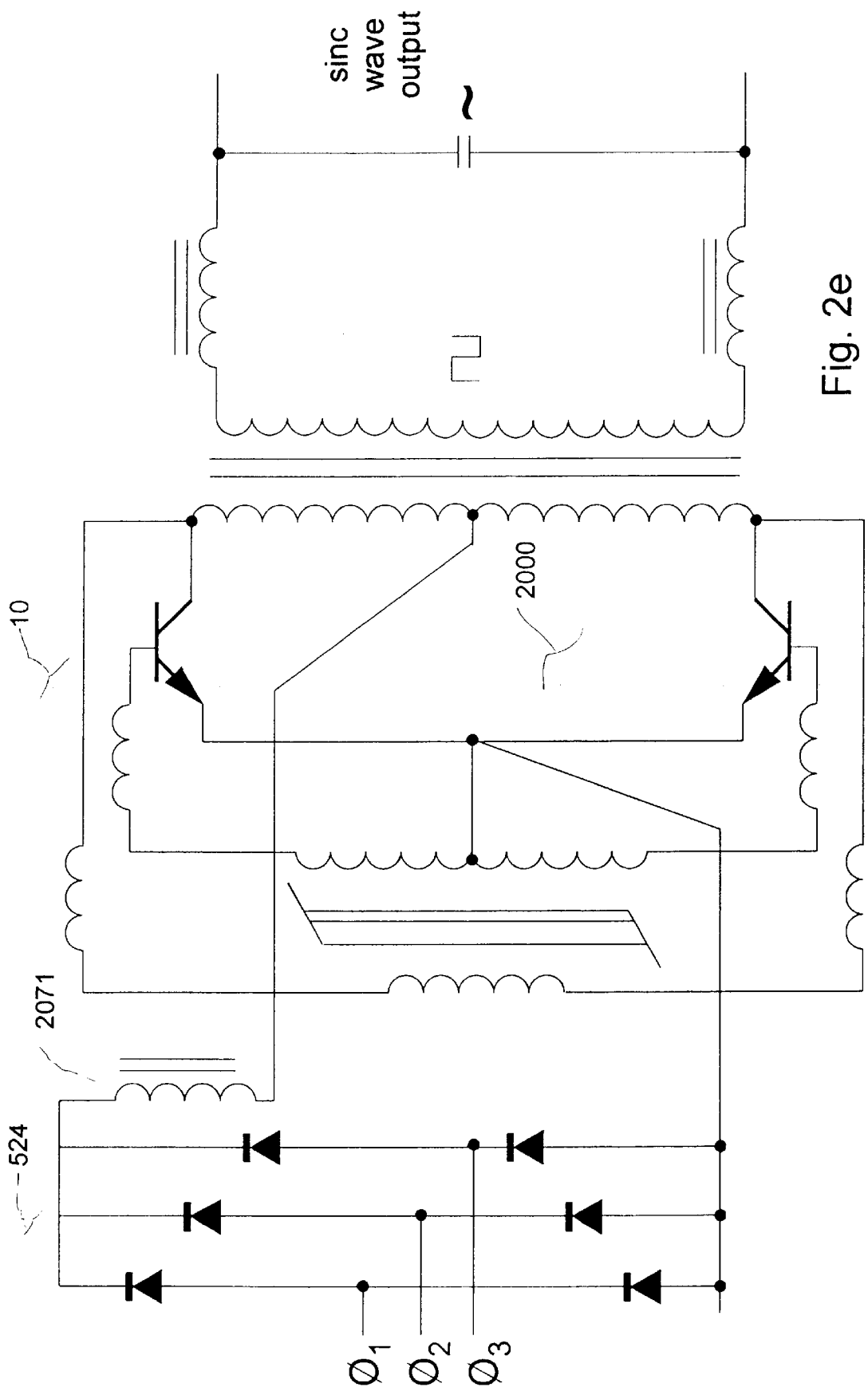
FIG. 2E shows a three-phase rectifier and an improved "stationary converter" dc-to-ac inverter, with an inductor added to increase input power factor.
Figure 2F:
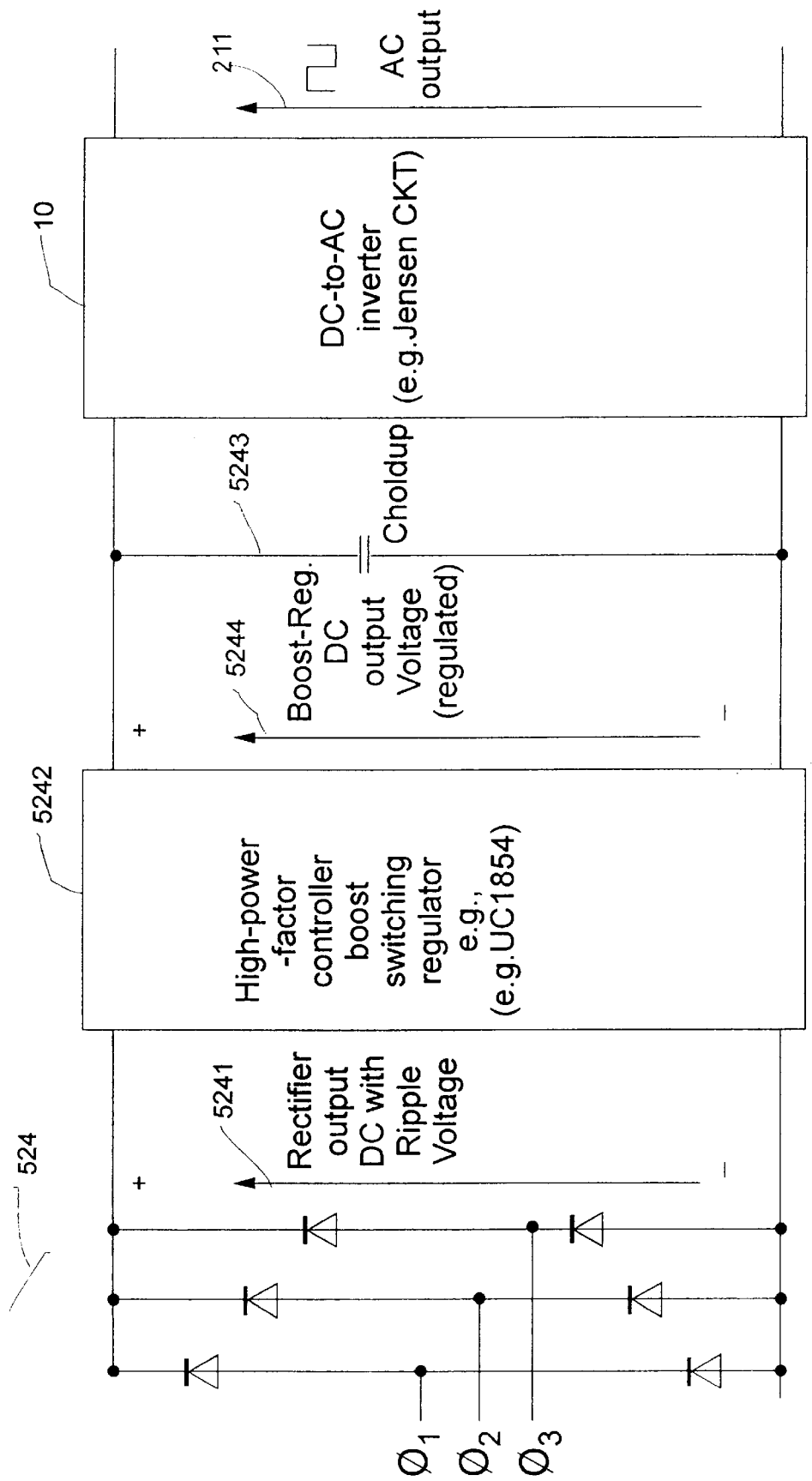
FIG. 2F replaces the inductor of FIG. 2E by a high-power factor controller boost switching regulator to further increase the input power factor.

FIG. 2F replaces the inductor, 2071, of FIG. 2E by a high-power factor controller boost switching regulator, 5242, to further increase the input power factor. The boost regulator, 5242, may employ a high-power-factor controller such as the Unitrode Integrated Circuits Corporation part number UC1854. This part and its application is well documented in the Unitrode literature, which may be found in *Product & Applications Handbook '93–'94*, #IC850, Unitrode Integrated Circuits Corporation, 7 Continental Boulevard, Merrimack, N.H. 03054, USA, Telephone: (603) 424-2410 FAX: (603) 424-3460. Block 5242 provides a regulated DC output voltage, 5244, to Dc-to-AC inverter, 10, removing one cause of ac output frequency variations, as well as fixing the output amplitude of DC-to-AC converter, 10. The capacitor Choldup, 5243, provides a storage of charge, which permits DC-to-AC inverter, 10, to continue to provide ac output, 211, for a few milliseconds after any transient low input line voltage condition. This provides some immunity to short "sags", and provides time for orderly shutdown of loads, if a low-input voltage warning signal is provided by boost regulator, 5242, as is often done. The UC1854 and similar high-power-factor controllers are capable of providing input power factors to the n-phase power source, of greater than 0.99 when working in a normal single-phase system. With an 3-phase input as illustrated in FIG. 2F, the identical circuit should provide an increased input power factor, since the error source known as "cusp distortion", described in the Unitrode literature should not be present when using the controller with an n-phase power source. This is because the additional phases do not permit the minimum input voltage to the high-power-factor boost regulator to momentarily drop to zero, as with a single-phase full-wave bridge rectifier, for example, since the additional phases fill in the "hole" between the two half-cycles of the one-phase input. The cusp distortion is analogous to crossover distortion in amplifiers, and is removed by the filling-in of the ripple waveform, since the input voltage no longer instantaneously reaches the problematic near-zero-volts low input voltage range.

The 1854 power factor controller and design procedure are described in the following Unitrode IC Corp. literature:
(1) UC1854/2854/3854 High Power Factor Preregulator (1854 Data Sheet)
(2) U-134, UC3854 Controlled Power Factor Correction Circuit Design
(3) DN-39D, Optimizing Performance in UC3854 Power Factor Correction Applications
(4) DN-41, Extended Current Transformer Ranges
(5) U-140, Average Current Mode Control of Switching Power Supplies.

In summary the method of the FIG. 2, etc., system for evenly balancing the electrical loading on an n-phase electrical power source includes the steps of:

rectifying said n-phase electrical power source to produce DC voltage source;

connecting said DC voltage source to a dc-to-ac inverter, for generating an ac output voltage;

generating said AC output voltage from said DC voltage;

connecting ac loads to said ac output voltage, thereby supplying an output ac load current to said ac loads;

whereby, said output ac load current is reflected back through said dc-to-ac inverter as a DC load current on said DC voltage source, and whereby said DC load current is in turn reflected back through said n-phase rectifier as an input ac load current on said n-phase electrical power source, said input ac load current being provided equally by said n phases of said n-phase power source by said n-phase rectifier, thereby balancing said ac output load current equally on said n phases of said n-phase power source.

Figure 3:
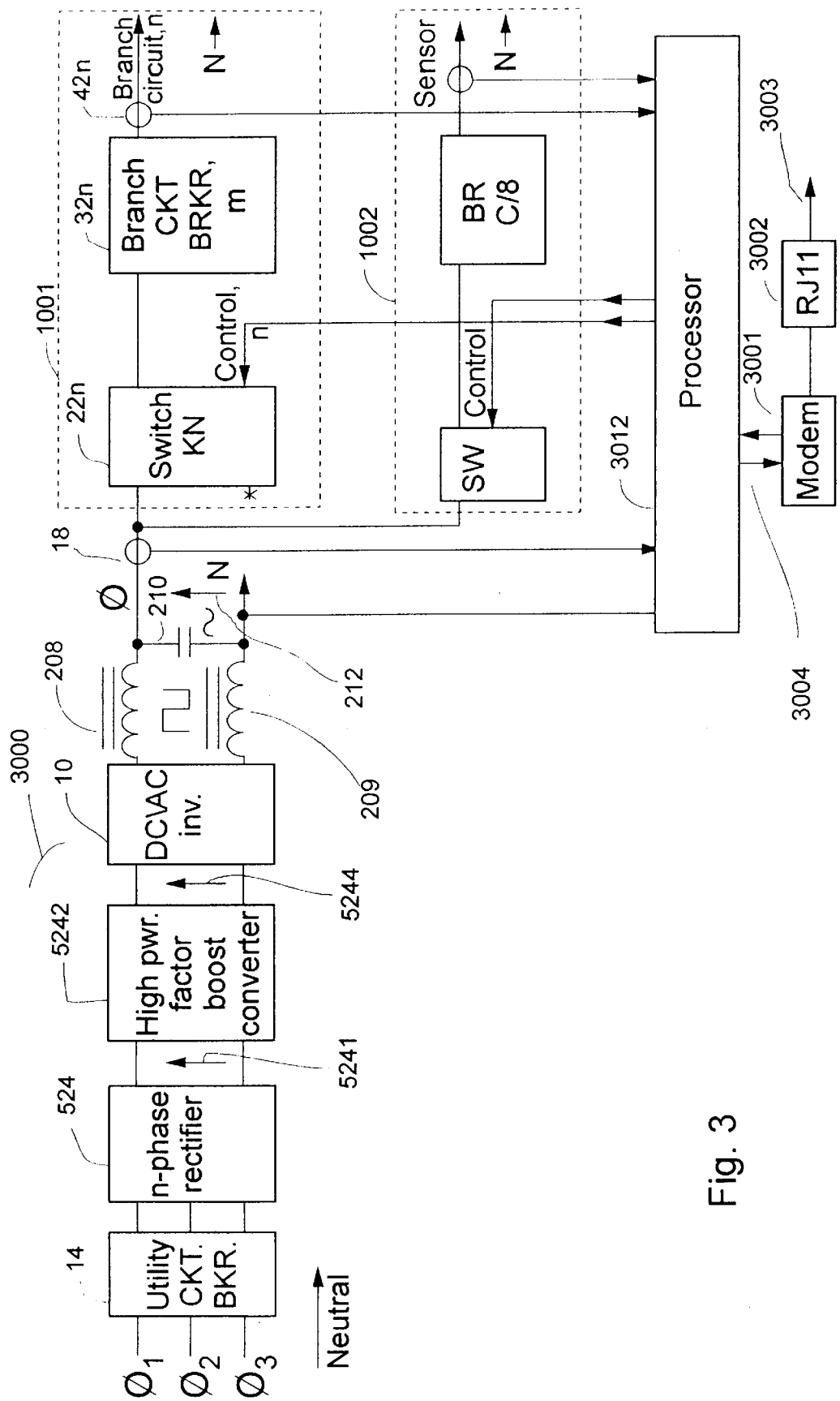
FIG. 3 is a block diagram of an embodiment of the present invention, combining the features of the systems of FIGS. 1B and 2F, and further adding communications capability.

FIG. 3 is a block diagram of an embodiment of the present invention, combining the features of the systems of FIGS. 1B and 2F, and further adding communications capability, for example, with the electric company or with the consumer, via communications link, e.g., modem, 3001. The implementation of the system of FIG. 2F is inserted between utility circuit breaker, 14, of FIG. 1B, and the rest of the FIG. 1B system, providing automatic load-balancing, and also high power factor, as described above. The FIG. 1B system is represented here as n units, of circuitry labelled 1001 . . . 1002, which represent each unit of circuitry associated with each of m branch circuits. These m branch circuit "units" are connected to processor 3012 the same as to processor 12 in FIG. 1B, and are not only controlled in the same way by processor 3012, to limit maximum loading on the n-phase utility circuit by limiting the maximum load current provided by dc-to-ac inverter, 10, but processor 3012 has additional capabilities as will be described. Now, modem, 3001, is connected by bilateral data bus, 3004, to processor 12. Modem, 3001, is preferably connected by RJ11 interface, 3002, to the central office telephone line, 3003. Modem, 3001, provides communications capability, for example with the electric utility company or with the consumer.

In addition the preprogrammed control by processor 12 of the connecting and disconnecting of loads, i.e, branch circuits, in response to current measurements performed by sensors, 18 and 42m, processor 3012 also accepts programming to control adding and dropping loads as a function of time, e.g., time-of-day or day-of-week. Also the dropping of loads in case of a power-line overload condition, and the reconnecting of loads, may be performed according to priorities pre-programmed by the consumer into processor, 3012. Thus, the electric power consumer may exercise control over the operation of equipment at his site, even in his absence. Further, processor 3012 may report data to the electric company, communicating via modem 3001. Yet further, the electric company may make inquiries of the processor, e.g., concerning loading of each of the phases in an n-phase system as in FIG. 1, or of loading on each branch circuit, in any of the implementations illustrated in the Figures. Also, the electric company or the consumer may issue commands to the processor, e.g., to connect or disconnect loads, thereby exercise control over the loads in the consumer's facility via modem, 3001, and processor, 3012, and the electric company or the consumer may remotely reprogram processor, 3012, via modem, 3001. While a wired telephone line connection is shown, the use of cellular phone, or other wireless communication method of realizing a communications link with processor 3012 is equally included within the scope of the invention.

FIG. 4 shows an alternative implementation 5400 of the combination of blocks 52 and 54 of FIG. 2, for a three-phase system, as an example of an n-phase system, with n=3. In FIG. 4, each phase is first rectified, in rectifiers 401–403, with each rectifier output serving as the input to a separate power-factor correction (PFC) module, 405–407, such as discussed above, e.g., using a UC1854 or similar controller. The outputs of the n power-factor correction modules are connected together, and to holdup capacitor 409, providing a DC output, 410. The n PFC modules have a common load-sharing buss interconnection, 408, as is discussed in the Unitrode literature with respect to their UC1907 Load Share Controller integrated circuit, for example, and with respect to switching regulator controllers, such as the UC1842. The purpose of the load-sharing buss is to assure that each PFC module provides an equal share of the load current as each other PFC module, plus-or-minus a tolerance, say 10% or less.

The advantage of the FIG. 4 implementation over that of FIGS. 2 and 2B, is that the FIG. 4 implementation more certainly provides both improved load balancing on the n phases, and improved power factor on each of the n phases.

Figure 5A:
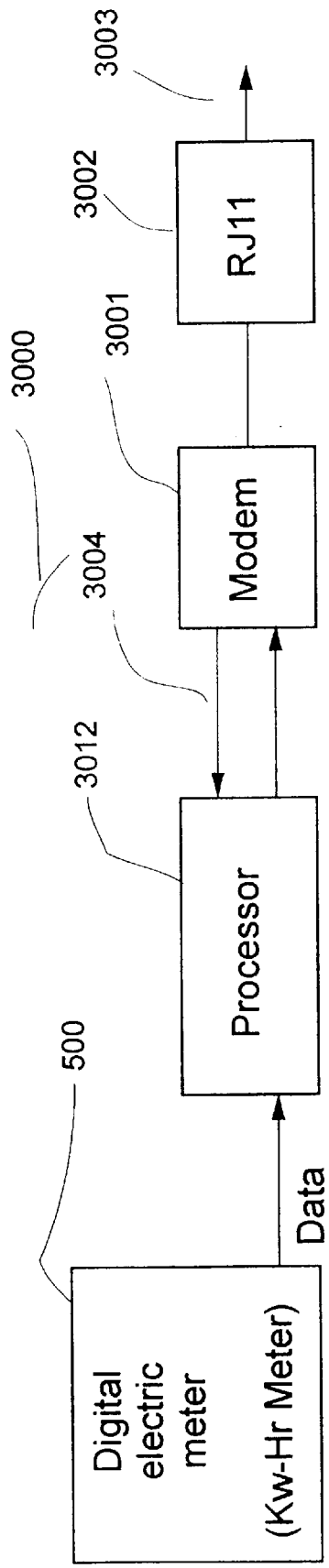
FIG. 5A shows a digital electric meter connected to a processor.

FIG. 5 shows the additional connection of a digital electric meter, 5001, to a processor, 3012, such as processor 3012 of FIG. 3. Digital electric meter 5001 is a digital kilowatt-hour meter, which records cumulative electric power consumption. The processor, 3012, has associated connection 3004 to modem 3001, which is preferably connected via interface 3002 to central office telephone line 3003. With this arrangement, the electric power usage of the consumer facility is made available through the processor and communications link for transmission to an inquiring location, e.g., the electric utility power company.

Figure 5B:
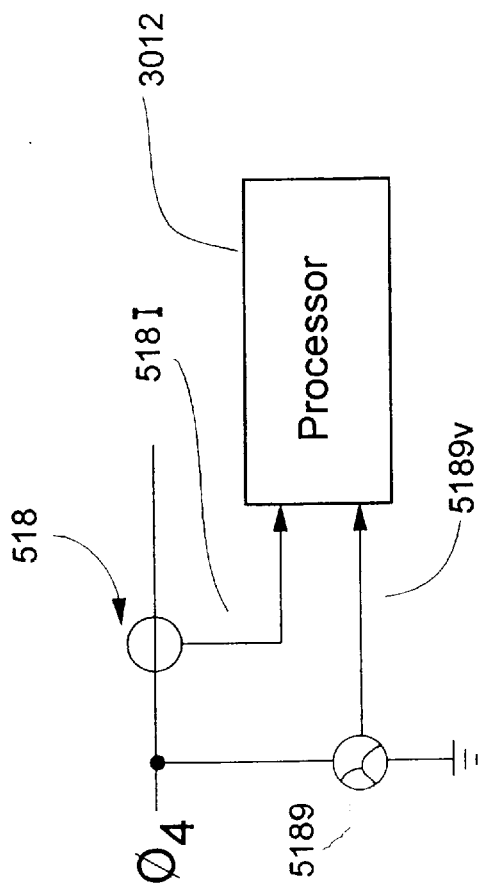
FIG. 5B illustrates power measurement function hardware.

In another embodiment, implicitly included in FIG. 3, the current sensors 18 and 42n are continuously monitored by processor 3012, and in conjunction with simultaneous voltage measurements at the locations of the current sensors, the instantaneous power consumption may be calculated as is well known, and may be continually summed, "integrated", in processor 3012, to maintain the cumulative electric power consumption of the facility. The necessary hardware for each power measurement is illustrated in FIG. 5B, showing current sensor 518 with output 518I to processor 3012, and voltage sensor 5189 with output 5189V to processor 3012. Thus the functionality of digital power meter 5001 may be incorporated in the system of FIG. 3, and similarly in an n-phase system, such as in FIG. 1.

The digital power meter function, whether implemented as a discrete instrument as in FIG. 5, or as implicitly in FIG. 3, as described above, may be useful in any of the systems described herein, even without a communications link, for providing an additional parameter for use in load management.

While the invention has been described with respect to a limited number of embodiments, it will be appreciated that many variations, modifications and other applications of the invention may be made. In particular, the usual n-phase case of n=3 has been used an example. In general, the number of phases is not limited to three phases, but may be any number of phases. Further, any form of communications link may be used for the exchange of information between the consumer-site processor and the electric company.

What is claimed is:

1. A three phase load distribution system for evenly distributing an electrical load, present on a plurality of branch circuits, across a three phase power distribution network, comprising:

a first, second and third current sensor coupled to a first, second and third phase, respectively, of the three phase electrical power distribution network, said first, second and third current sensors for measuring electrical currents flowing through said first, second and third phase, respectively;

a plurality of switches, each of said switches coupled to one of the plurality of branch circuits, each of said plurality of switches for connecting any one of said first, second or third phases to one of the plurality of branch circuits;

a plurality of current sensors for measuring electrical currents flowing through each of said plurality of branch circuits; each of said current sensors coupled to one of said plurality of branch circuits; and a processor coupled to said first, second and third current sensors, said plurality of switches and said plurality of current sensors;

said processor for calculating,
 (a) differences between said electrical currents flowing through each pair of said first, second and third phases, and,
 (b) ratios of said electrical currents flowing through each pair of said first, second and third phases;

said processor for controlling said plurality of switches so that a function selected from the group consisting of (a) the differences between, and (b) the ratios of, said electrical currents flowing through each pair of said first, second and third phases do not exceed a predetermined threshold;

said processor calculating alternative combinations of branches to be connected by said switches to said phases, and said processor controlling re-connection of said branches by said switches to said phases so that said functions do not exceed said threshold.

2. The system of claim 1, further comprising a communications link connected to said processor for providing communications capability.

3. The system of claim 1, further comprising a digital power meter function, said digital power meter including power measurement capability, said digital power meter selected from the group consisting of
 (a) a digital kilo-watt-hour meter for recording cumulative electric power consumption, and
 (b) a combination of a voltage sensor with a said current sensor said voltage and current sensors having outputs to said processor for calculating a power-related measurement selected from the group consisting of instantaneous power consumption and cumulative electric power consumption, said power meter function for providing an additional parameter for use in load management.

4. An at least one phase load distribution system for evenly distributing an electrical load, present on a plurality of branch circuits, across an at least one phase power distribution network, comprising:

at least one current sensor coupled to at least one phases, respectively, of the at least one phases electrical power distribution network, said at least one current sensors for measuring electrical currents flowing through said at least one phases, respectively;

a plurality of switches, each of said switches coupled to one of the plurality of branch circuits, each of said plurality of switches for connecting any one of said at least one phases to one of the plurality of branch circuits;

a plurality of current sensors for measuring electrical currents flowing through each of said plurality of branch circuits; each of said current sensors coupled to one of said plurality of branch circuits; and a processor coupled to said current sensors, said plurality of switches and said plurality of current sensors;

said processor for calculating,
 (a) the differences between said electrical currents flowing through each pair of said at least one phases, and,
 (b) the ratios of said electrical currents flowing through each pair of said at least one phases;

said processor for controlling said plurality of switches so that a function selected from the group consisting of (a) the differences between, and (b) the ratios of, said electrical currents flowing through each pair of said at least one phases do not exceed a predetermined threshold;

said processor calculating alternative combinations of branches to be connected by said switches to said phases, and said processor controlling re-connection of said branches by said switches to said phases so that said functions do not exceed said threshold.

5. The system of claim 4, further comprising a communications link connected to said processor for providing communications capability.

6. The system of claim 4, further comprising a digital power meter function, said digital power meter including power measurement capability, said digital power meter selected from the group consisting of
 (a) a digital kilo-watt-hour meter for recording cumulative electric power consumption, and
 (b) a combination of a voltage sensor with a said current sensor said voltage and current sensors having outputs to said processor for calculating a power-related measurement selected from the group consisting of instantaneous power consumption and cumulative electric power consumption, said power meter function for providing an additional parameter for use in load management.

7. A three phase load distribution system for evenly distributing an electrical load, present on a plurality of branch circuits, across a three phase power distribution network, comprising:

a first, second and third current sensor coupled to a first, second and third phase, respectively, of the three phase electrical power distribution network, said first, second and third current sensors for measuring electrical currents flowing through said first, second and third phase, respectively;

first, second and third circuit breakers coupled to said first, second and third phases, respectively;

a plurality of switches, each of said switches coupled to one of the plurality of branch circuits, each of said plurality of switches for connecting any one of said first, second or third phases to one of the plurality of branch circuits;

a plurality of circuit breakers, each coupled to one of the plurality of branch circuits;

a plurality of current sensors for measuring electrical currents flowing through each of said plurality of branch circuits; each of said current sensors coupled to one of said plurality of branch circuits;

a processor for controlling said plurality of switches so that said electrical currents flowing through each of said first, second and third phases does not exceed a predetermined threshold; said processor coupled to said first, second and third current sensors, said plurality of switches and said plurality of current sensors; and, a communications link connected to said processor for providing communications capability.

8. A system as in claim 7, further comprising a digital power meter function, said digital power meter including power measurement capability, said digital power meter selected from the group consisting of
 (a) a digital kilo-watt-hour meter for recording cumulative electric power consumption, and
 (b) a combination of a voltage sensor with a said current sensor said voltage and current sensors having outputs to said processor for calculating a power-related measurement selected from the group consisting of instantaneous power consumption and cumulative electric power consumption, said power meter function for providing an additional parameter for use in load management, and said power meter function for providing electric power usage of a consumer facility via said communications link.

9. A three phase load distribution system for evenly distributing an electrical load, present on a plurality of branch circuits, across a three phase power distribution network, comprising:

a first, second and third current sensor coupled to a first, second and third phase, respectively, of the three phase electrical power distribution network, said first, second and third current sensors for measuring electrical currents flowing through said first, second and third phase, respectively;

a plurality of switches for receiving and decoding corresponding control signals, each of said switches coupled to one of the plurality of branch circuits, each of said plurality of switches for connecting any one of said first, second or third phases to one of the plurality of branch circuits;

a plurality of current sensors for measuring electrical currents flowing through each of said plurality of branch circuits; each of said current sensors coupled to one of said plurality of branch circuits;

a processor for controlling said plurality of switches so that said electrical currents flowing through each of said first, second and third phases does not exceed a predetermined threshold; said processor coupled to said first, second and third current sensors, said plurality of switches and said plurality of current sensors; and, a communications link connected to said processor for providing communications capability, further comprising a digital power meter function said digital power meter including power measurement capability, said digital power meter selected from the group consisting of
  (a) a digital kilo-watt-hour meter for recording cumulative electric power consumption, and
  (b) a combination of a voltage sensor with a said current sensor said voltage and current sensors having outputs to said processor for calculating a power-related measurement selected from the group consisting of instantaneous power consumption and cumulative electric power consumption, said power meter function for providing an additional parameter for use in load management, and said power meter function for providing electric power usage of a consumer facility via said communications link.

10. An at least one phases load distribution system for evenly distributing an electrical load, present on a plurality of branch circuits, across an at least one phases power distribution network, comprising:

at least one current sensor coupled to at least one phases, respectively, of the at least one phases power distribution network, said at least one current sensor for measuring electrical current flowing through said at least one phase, respectively;

a plurality of switches for receiving and decoding corresponding control signals, each of said switches coupled to one of the plurality of branch circuits, each of said plurality of switches for connecting any one of said at least one phases to one of the plurality of branch circuits;

a plurality of current sensors for measuring electrical currents flowing through each of said plurality of branch circuits; each of said current sensors coupled to one of said plurality of branch circuits; and a processor for controlling said plurality of switches so that said electrical currents flowing through each of said at least one phases does not exceed a predetermined threshold; said processor coupled to said at least one current sensors, said plurality of switches and said plurality of current sensors;

further comprising a digital power meter function, said digital power meter including power measurement capability, said digital power meter selected from the group consisting of:
  (a) a digital kilo-watt-hour meter for recording cumulative electric power consumption, and
  (b) a combination of a voltage sensor with a said current sensor said voltage and current sensors having outputs to said processor for calculating a power-related measurement selected from the group consisting of instantaneous power consumption and cumulative electric power consumption, said power meter function for providing an additional parameter for use in load management.

\* \* \* \* \*